UNITED STATES PATENT OFFICE.

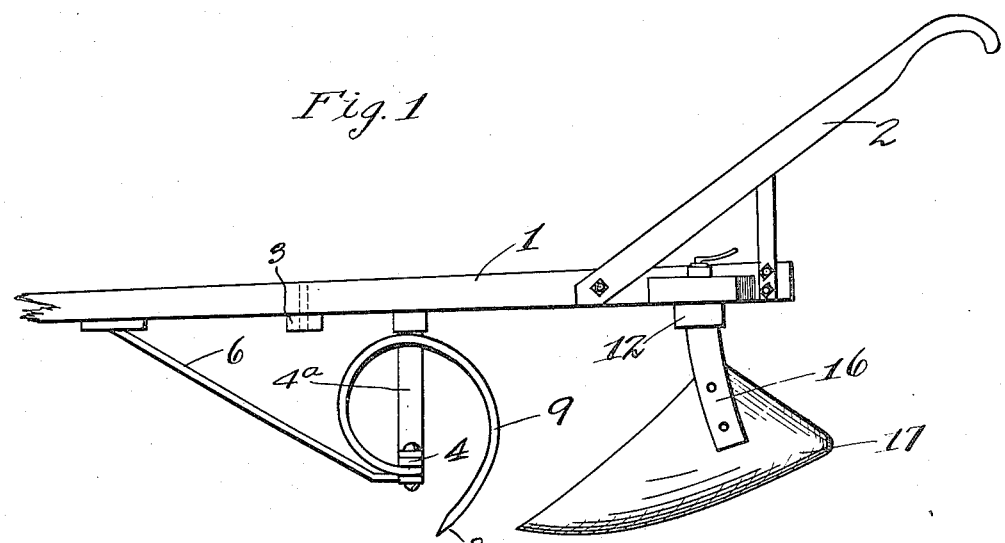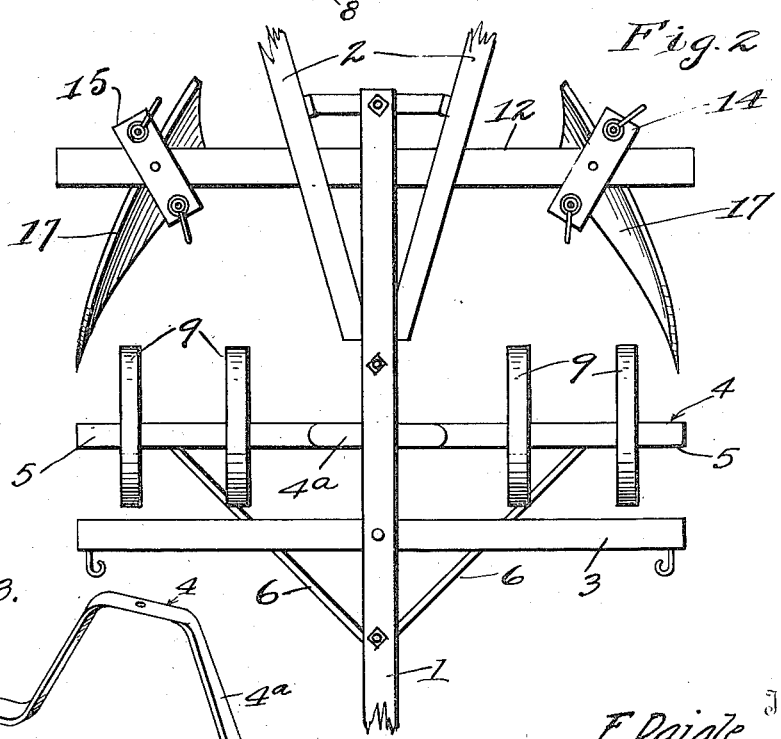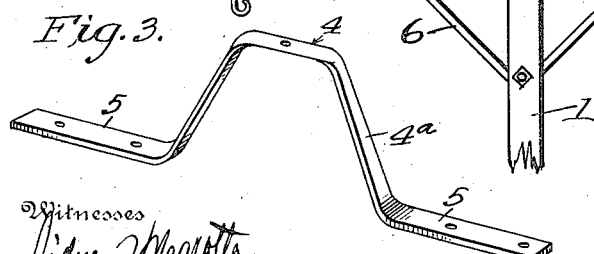

FIRMIN DAIGLE, OF DAIGLE, MAINE, ASSIGNOR TO ELIZABETH DAIGLE, OF MILLINOCKET, MAINE.

POTATO-CULTIVATOR.

1,268,687.

Specification of Letters Patent.    Patented June 4, 1918.

Application filed May 7, 1914.   Serial No. 836,999.

*To all whom it may concern:*

Be it known that I, FIRMIN DAIGLE, a citizen of the United States, residing at Daigle, in the county of Aroostook and State of Maine, have invented certain new and useful Improvements in Potato-Cultivators, of which the following is a specification.

This invention relates to cultivators, and has as its primary object the provision of a cultivator adaptable for the efficient cultivation of agricultural products such as potatoes or the like, which are planted in rows and which it is necessary to hill for the proper cultivation thereof.

Another object of this invention is the provision of a cultivator as specified, which has a plurality of cultivating shovels or teeth formed thereupon, and arranged forwardly of a pair of diagonally disposed hilling shovels, so that the ground may be efficiently cultivated and hilled or ridged in a single operation.

With the foregoing and other objects in view, this invention consists in such novel features of construction, combination and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is a side elevation of the improved cultivator, and

Fig. 2 is a top plan view of the cultivator, showing parts thereof broken away.

Fig. 3 is detail perspective of a part of the cultivator structure.

Referring more particularly to the drawings, 1 designates the supporting beam of the cultivator, which has the handles 2 connected thereto, and extending rearwardly therefrom. The supporting beam 1 has depending therefrom a double tree 3, which double tree is connected to the beams forwardly of the connections between the handles 2 and the cross beams, as is clearly shown in Fig. 2 of the drawings, and it has a second cross beam or piece 4 positioned rearwardly thereof and extending transversely of the beam 1. The cross piece 4 is securely held in place by braces 6 and is crank shaped or arched, having a substantially inverted U-shaped portion 4ª upon the lower ends of which are formed horizontal portions 5. The inverted U-shaped portion or arch 4ª permits the cultivator to straddle a row of growing potatoes or the like during the cultivation thereof.

The cross piece 4 has securely attached thereto, in spaced relation with each other, cultivating teeth 9, which teeth are formed of arcuate, resilient strips of metal, having their free terminal ends 8 sharpened, so as to gouge or dig into the ground over which the cultivator travels for stirring up the ground and uprooting weeds for the proper cultivation of the agricultural products. The cultivating teeth curve upwardly from point of connection with the bar 4.

The cultivating teeth 9 are mounted upon the cross bar 4, so as to leave a space between the innermost cultivating teeth for the accommodation of the row in which the agricultural product is planted. A cross piece 12 is attached to the beam 1 of the cultivator rearwardly of the point of connection between the beam and the handles 2, and this cross piece has adjustably connected near its outer ends, plates 14 and 15, each of which plates has a depending supporting arm 16 formed thereupon. The depending supporting arms 15 and 16 have secured to their lower terminal ends, hilling shovels 17, which shovels will rake the soil or pull it up into ridges about the agricultural product for forming a ridge or hill about the same, which is necessary for the proper cultivation of various agricultural products such as potatoes or the like. The angle at which the hilling shovels 17 are set may be adjusted by the various movements of the plates 14 and 15, so that the height and width of the ridges formed thereby may be regulated as the occasion demands.

When the cultivator is used, the resilient cultivating teeth 9 will rake up and stir the soil, uprooting the weeds, and the hilling shovels 17, being disposed rearwardly of the cultivating teeth will gather up the soil and properly ridge it about the potatoes or like agricultural product.

In reducing the invention to practice, such minor details of construction, combination and arrangement of parts may necessitate alterations, to which the patentee is entitled provided such alterations are comprehended within the scope of what is claimed.

What is claimed is:—

In a straddle row cultivator as set forth, the combination, of a beam, an arched cross bar attached to said beam and provided with horizontal laterally extending end portions, a plurality of resilient dirt loosening members carried by said horizontal end portions, and a plurality of dirt ridging members adjustably carried by said beam rearwardly of said dirt loosening members for ridging the dirt loosened by said dirt loosening members.

In testimony whereof I affix my signature in presence of two witnesses.

FIRMIN DAIGLE.

Witnesses:
   DENIS V. DAIGLE,
   BAPTISTE BOURGOIN.